Feb. 17, 1931.         G. F. DE WEIN         1,792,733
POWER TRANSMITTING DEVICE
Filed April 21, 1928

Inventor
G. F. DeWein

Patented Feb. 17, 1931

1,792,733

UNITED STATES PATENT OFFICE

GEORGE F. DE WEIN, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE

POWER-TRANSMITTING DEVICE

Application filed April 21, 1928. Serial No. 271,744.

The present invention relates in general to improvements in the art of transmitting power, and relates more specifically to improvements in the construction and operation of driving mechanisms wherein rotary motion is transmitted from one member to another through one or more flexible endless driving elements such as V-belts.

An object of the invention is to provide an improved power transmitting device wherein motion may be effectively transmitted by friction through a flexible endless element which is relatively inelastic. Another object of the invention is to provide a driving mechanism for transmitting power through a plurality of endless belts, formed of any relatively inelastic material capable of resisting the tension to which they are to be subjected, and wherein equalization or equal distribution of the torque between the several transmission belts, is insured. A further object of the invention is to produce an improved sheave structure which will automatically provide for proper seating of endless driving elements cooperating with the grooves of the sheave. Still another object of the invention is to provide improvements in sheave structures of the type disclosed in application Ser. No. 243,532, filed December 30, 1927, wherein the sheave is provided with annular V-grooves having elastic driving walls cooperable with the opposite sides of the driving belts. These and other objects of the invention, and the manner of accomplishing the desired results, will be apparent from the following description.

A clear conception of several embodiments of the invention and of the mode of constructing and of operating devices built in accordance therewith, may be had by referring to the drawing accompanying and forming a part of this specification in which like reference characters designate the same or similar parts in the various views.

Figure 1:
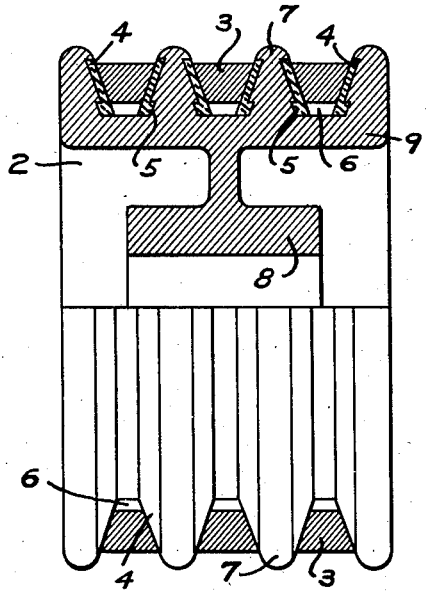
Fig. 1 is a part sectional elevation of a multiple belt drive embodying grooves having elastic side facings.

Referring specifically to Fig. 1, the improved power transmitting device comprises a pair of sheaves 2 each having a hub 8 and a rim 9, the latter being provided with a series of annular V-grooves 6 provided with elastic side facings 4 which during normal operation of the drive cooperate with the opposite sides of V-belts 3. The rim 9 of the sheave 2 is provided with a series of rigid annular flanges 7 which positively prevent transmission of lateral pressure from one belt 3 to the other. The facings 4 may be formed of rubber or other relatively elastic material, and are provided with lips or projections 5 engaging annular recesses formed in the sheave, in order to prevent outward displacement of the facings 4. The facings 5 may also be otherwise attached to the sheave 2, as by vulcanizing, in order to positively prevent outward displacement of the facings.

Figure 2:
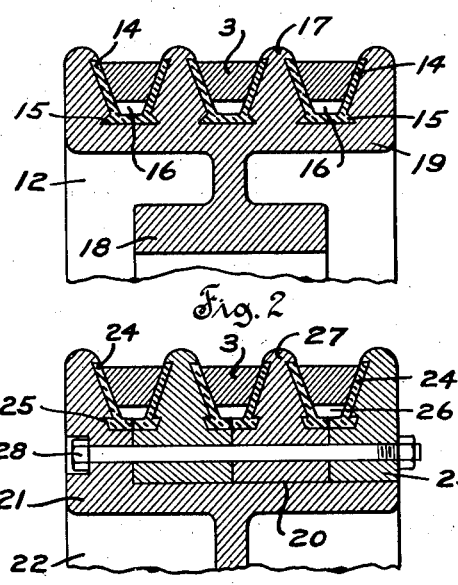
Fig. 2 is a fragmentary sectional view of a multiple belt drive embodying grooves having elastic side facings of modified construction.

In the embodiment of the invention illustrated in Fig. 2, each sheave 12 has a hub 18, and a rim 19 formed integral with the hub. The rim 19 is provided with a series of peripheral flanges 17 which are formed integral with the rim 19 and are separated by annular V-grooves 16. The V-grooves 16 are provided with elastic facings 14 of trough shape, these facings being formed with annular dovetails at their inner ends cooperating with dovetailed recesses 15 in the sheave 12 in order to prevent outward displacement of the facings 14. The elastic facings 14 may be formed of rubber or the like, and are adapted to cooperate with the side surfaces of the V-belts 3, as shown.

Figure 3:
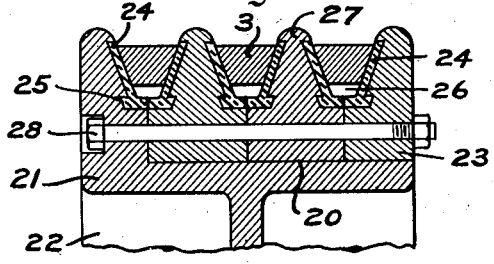
Fig. 3 is a fragmentary sectional view of a multiple belt drive embodying a built-up sheave the grooves of which are provided with elastic side facings.

Referring to the embodiment of the invention illustrated in Fig. 3, each sheave 22 has its rim 21 provided with a cylindrical surface 20 adapted to receive a series of ring members 23 having outwardly projecting integral flanges 27. The ring members are rigidly attached to the rim 21 by means of clamping bolts 28, and the grooves 26 formed by the flanges 27 are provided with elastic facings 24 having retaining lips 25 cooperating with recesses in the adjacent elements for the purpose of preventing outward displacement of the facings 24. The driving belts 3 are adapted to cooperate with the facings 24 as shown, and these facings may be formed of rubber or similar elastic material.

Figure 4:
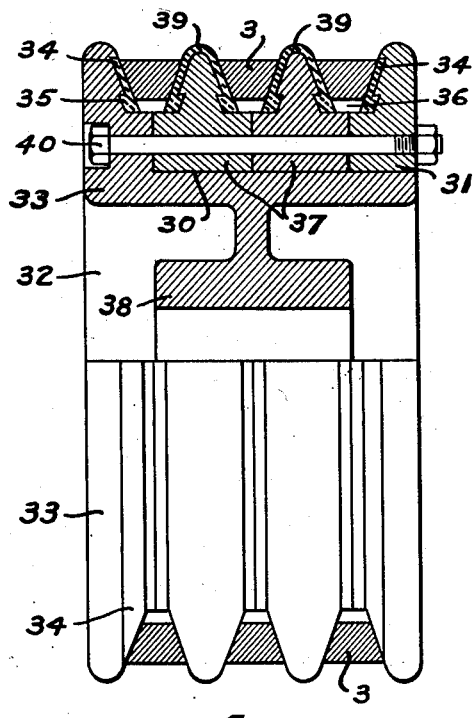
Fig. 4 is a part sectional view of a multiple belt drive embodying a sheave formed of separate sections, and having the side surfaces of the grooves provided with a modified construction of elastic facings.

Referring specifically to the embodiment of the invention illustrated in Fig. 4, each sheave 32 comprises a hub 38 and a rim 33 rigidly attached to the hub; the rim 33 being provided with a cylindrical outer surface 30 formed for the reception of a series of ring members 37, as shown. The ring members 37 are clamped between an end ring 31 and an end flange formed on the rim 33, by means of clamping bolts 40, and the ring members 37 are provided with outwardly extending flanges which are covered with elastic facings 39 anchored thereto, as shown. The end ring 31 and the end flange of the rim 33 are likewise provided with elastic facings 34 having annular anchoring projections 35 as shown. The facings 34, 39 cooperate to form annular V-grooves 36, and are adapted to engage the opposite sides of the driving belts 3, during normal operation of the drive.

Figure 5:
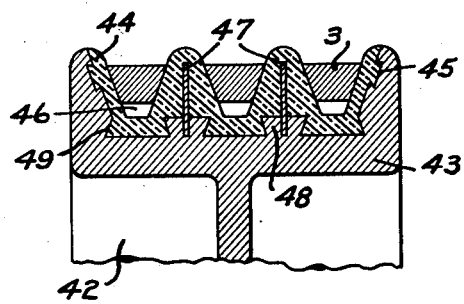
Fig. 5 is a fragmentary sectional view through a multiple belt drive showing still another form of groove construction for the sheave.

In the embodiment of the invention illustrated in Fig. 5, each sheave 42 is provided with a rim 43 having end walls, and dovetailed annular projections 48 located between the end walls. Annular plates 47 are rigidly attached to the dovetailed projections 48 as by welding, and an elastic ring element 44 is caused to cooperate with the end flanges and with the plates 47. The elastic element 44 is provided with annular projections 45, 49 for retaining the same against outward displacement, and is formed with a series of annular V-grooves 46 which provide resilient facings for engaging the sides of the driving belts 3.

During normal operation of drives of this type, the belts 3 are subjected to tension and are forced into the grooves of the sheaves by the longitudinal pull on the belts. Due to the elasticity of the facings provided in accordance with the present invention, all of the belts are capable of independently assuming proper positions within the grooves, corresponding to the longitudinal pull being exerted upon the belts. The elasticity of the facings will permit the belts to assume substantially equal driving torque, without disturbing or affecting the side pressure on the adjacent belts. The belts 3 may therefore be formed of leather or other relatively inelastic material, instead of being formed of rubber or rubber composition, and the driving torque will be substantially equalized as between the several belts irrespective of the composition thereof. The facings of the grooves are preferably formed of rubber which may be vulcanized to the sheave structure, but these facings are preferably further provided with suitable anchoring projections, as shown.

It should be understood that it is not desired to limit the invention to the exact details of construction and operation herein shown and described, for various modifications within the scope of the claims may occur to persons skilled in the art.

It is claimed and desired to secure by Letters Patent:

1. In combination, a pair of spaced and rotatable members adapted to act as driving and driven elements and each provided with a plurality of peripheral grooves of substantially V-shape in cross-section, a surface portion of a side wall of each of said grooves being composed of elastic material, and a plurality of driving belts within and free of the bottom of the alined grooves of said members and having side-driving surfaces cooperatively engaging the elastic portions of the side walls of said grooves and adapted to drive the driven member through said side-driving engagement, said elastic wall portions of the grooves being laterally yieldable to permit each belt to enter farther into its groove in response to increased pull on said belt and vice versa to thereby decrease differential driving effects of said belts.

2. In combination, a pair of spaced and rotatable members adapted to act as driving and driven elements and each provided with a plurality of peripheral grooves of substantially V-shape in cross-section, surface portions of the side walls of each of said grooves being composed of elastic material, and a plurality of relatively inelastic driving belts within and free of the bottom of the alined grooves of said members and having side-driving surfaces cooperatively engaging the elastic portions of the walls of said grooves and adapted to drive the driven member through said side-driving engagement, said elastic wall portions of the grooves being laterally yieldable to permit each belt to ride farther into its groove in response to increased pull on said belt and to ride farther out of its groove in response to decreased pull on said belt, to thereby reduce differential driving effects of said belts.

3. In combination, a pair of spaced and rotatable members adapted to act as driving and driven elements and each provided with a plurality of peripheral grooves of substantially V-shape in cross-section, a surface portion of a side wall of each of said grooves being composed of elastic material, and a plurality of relatively inelastic driving belts of substantially V-shape in cross-section within and free of the bottom of the alined grooves of said members and having side-driving surfaces cooperatively engaging the elastic portions of the side walls of said grooves and adapted to drive the driven member through said side-driving engagement, said elastic wall portions of the grooves being laterally yieldable to permit the individual belts to assume positions in their respective grooves dependent upon the pull on each belt to thereby promote equalization of the driving effects of the individual belts.

4. In combination, a pair of spaced and rotatable members adapted to act as driving and driven elements and each provided with a plurality of peripheral grooves of substantially V-shape in cross-section, a surface portion of the side walls of each of said grooves being composed of elastic material, and a plurality of relatively inelastic driving belts of substantially V-shape in cross-section within and free of the bottom of the alined grooves of said members and having side-driving surfaces cooperatively engaging the elastic portions of the side walls of said grooves and adapted to drive the driven member through said side-driving engagement, said elastic wall portions of the grooves being laterally yieldable to permit each belt to ride farther into and out of its groove in response to increased and decreased pull of said belt respectively to thereby reduce differential driving effects of said belts.

5. In combination, a pair of spaced and rotatable members adapted to act as driving and driven elements and at least one provided with a plurality of peripheral grooves of substantially V-shape in cross-section, a surface portion of a side wall of each of said grooves being composed of elastic material, and a plurality of driving belts coacting with said members and lying within and free of the bottom of the said grooves and having side-driving surfaces cooperatively engaging the elastic portions of the side walls of said grooves, said elastic wall portions of the grooves being laterally yieldable to permit each belt to enter farther into its groove in response to increased pull on said belt and vice versa to thereby decrease differential driving effects of said belts.

In testimony whereof, the signature of the inventor is affixed hereto.

GEORGE F. DE WEIN.